July 8, 1952  E. C. HATCHER  2,602,713
THRUST BEARING
Filed Dec. 10, 1948  2 SHEETS—SHEET 1

Inventor
Ernest Charles Hatcher
by Sommers + Young
Attorneys

July 8, 1952  E. C. HATCHER  2,602,713
THRUST BEARING
Filed Dec. 10, 1948  2 SHEETS—SHEET 2
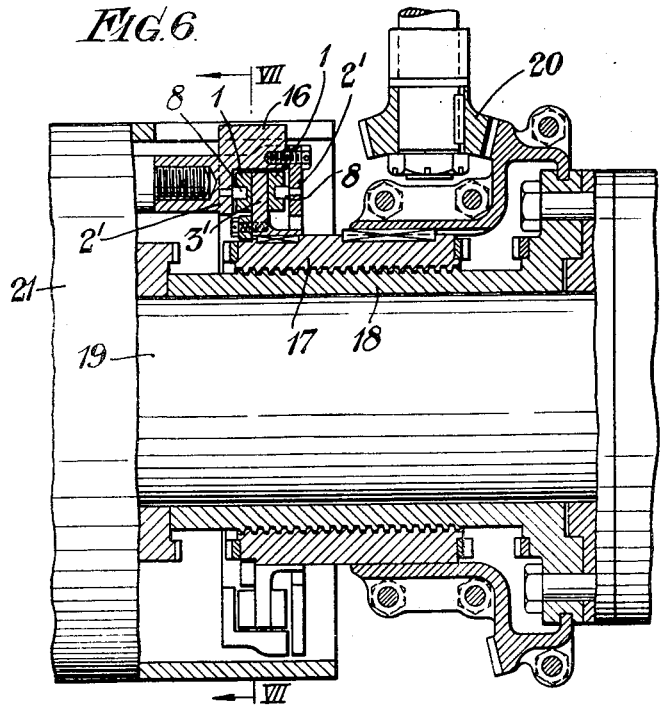
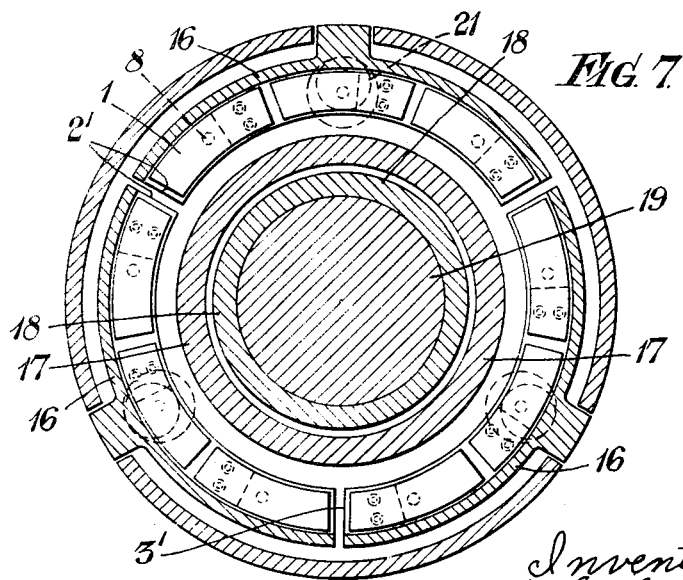
Inventor
Ernest Charles Hatcher
by Sommers + Young
Attorneys Patented July 8, 1952

2,602,713

UNITED STATES PATENT OFFICE 2,602,713

THRUST BEARING

Ernest Charles Hatcher, Northwood, England, assignor to J. Stone & Company Limited, Deptford, England, a corporation of Great Britain Application December 10, 1948, Serial No. 64,630
In Great Britain December 24, 1947

3 Claims. (Cl. 308—160)

This invention concerns improvements relating to thrust bearings, particularly bearings operating without the use of normal or oleaginous lubricants e. g. bearings running in water and other aqueous liquids, fuels such as petrol, and other liquids with low lubricating properties.

According to the invention, a thrust bearing capable of operating with lubrication by water or other liquids such as have been referred to comprises so-called tilting pads of a non-metallic bearing material co-acting with a metal surface having a Brinell hardness of not less than 250. By a non-metallic bearing material is to be understood a synthetic plastic, carbon or rubber or a composition including the same, or lignum vitae or the like. Obviously the selection of the materials in a particular case will be governed by the nature of the liquid and other operating conditions. For instance, it may be necessary to select a non-rusting or non-corroding metal. In the case of a water-lubricated bearing, a laminated phenolic plastic incorporating or based upon asbestos or cotton, is suitable for the tilting pads and the alloy beryllium-copper or beryllium bronze for the co-acting metal surface.

The pads, which will generally be of arcuate segmental shape, may each be arranged to tilt about a small plate secured to the rear of the pad at the trailing end. The pad may be located on the supporting body in a variety of ways, for example by means of a peg extending with axial and radial freedom into a recess in the rear of the pad. However, more elaborate pad-mounting and locating arrangements may be adopted. For instance, the pad-supporting body may have an annular rib of part-circular cross-section and the back of the small plate may be of complementary concave shape, so that the pad can adjust or align itself about the rib, as well as tilt about the plate. In this case, the locating peg is retained, but in other arrangements, it may be dispensed with. For instance, the place of both the plate and the pegs may be taken by a small ball, of say, stainless steel.

Figure 1:
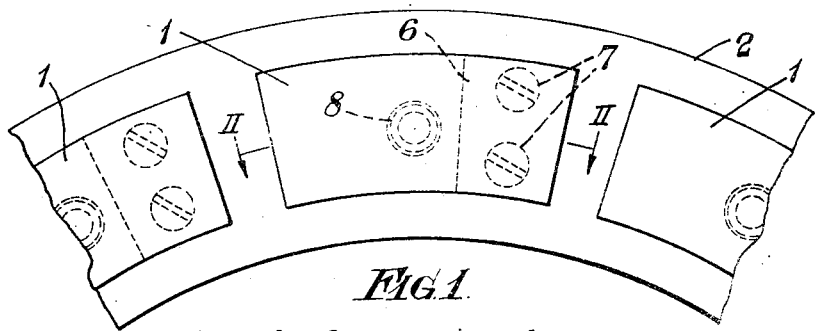
Figures 2, 4:
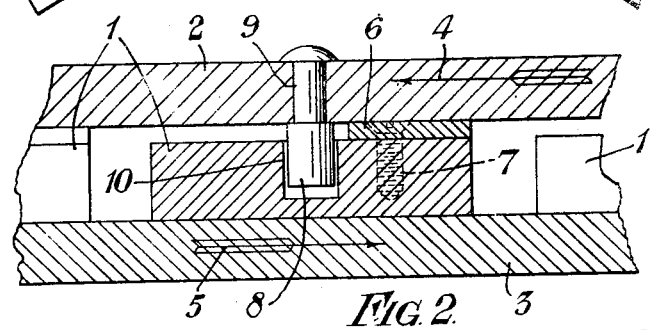
Figure 3:
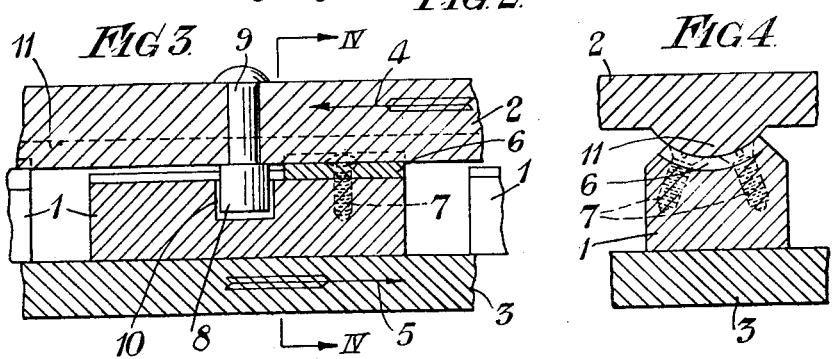
Figure 5:
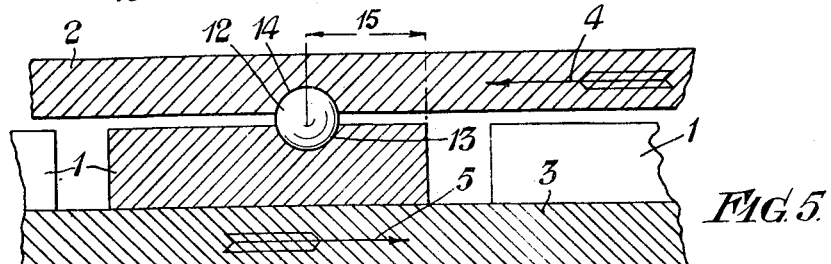

Various ways of carrying the invention into effect will now be more fully described by way of example and with reference to the accompanying drawings, in which:

Fig. 1 is an elevation of part of a thrust bearing,

Fig. 2 a section on the arcuate line II—II in Fig. 1,

Fig. 3 a section similar to Fig. 2 showing a modification,

Fig. 4 a section on the line IV—IV in Fig. 3,

Fig. 5 a section, similar to Fig. 2, showing a further modification,

Fig. 6 a vertical longitudinal section through a marine application of the bearing, and Fig. 7 a section on the line VII—VII of Fig. 6.

In the arrangement illustrated in Figs. 1 and 2, a series of pads 1 of arcuate segmental shape provide a thrust bearing between ring, plate or other bodies 2, 3 whose relative rotation is indicated by the arrows 4, 5 (either element or both elements may turn). The pads 1 are suitably made of or, at least, faced with a laminated phenolic plastic such as the material well known by the trade-mark "Ferrobestos." Each pad is arranged to tilt about the forward edge of a small flat plate 6 of, say, brass secured by countersunk screws 7 to the rear face of the pad at the trailing end (having regard to the direction of relative rotation). The plate 6 suitably extends for about 40% of the length of the pad 1, the rest of the pad being spaced away from the supporting body 2 by the thickness of the plate 6. The pad 1 is located upon the body 2 by means of a cylindrical peg 8 having its stem 9 riveted into the body 2 and extending with axial and radial freedom into a central round recess 10 in the rear of the pad. The body 3 with which the pads co-act is provided with a bearing surface of corrosion-resisting metal having a Brinell hardness of not less than 250. The metal may be beryllium copper or beryllium bronze or electrolytically deposited chromium or nickel.

In the more elaborate arrangement shown in Figs. 3 and 4, the pad-supporting body 2 has an annular rib 11 of part-circular cross-section (Fig. 4) and the back of the pad 1 and the small plate 6 are of complementary concave shape, so that the pad can adjust or align itself about the rib 11 as well as tilt about the said plate, i. e. it can move in two planes. In this arrangement, as in that of Figs. 1 and 2, the pad is located with the assistance of a peg 8.

In the modified arrangement of Fig. 5, the place of the plate 6 and the peg 8 is taken by a small ball 12 of, say, stainless steel which is let, substantially equally, into part-spherical recesses 13, 14 in the adjacent faces of the pad 1 and supporting body 2, the depth of the said recesses being such that a gap is maintained between the said faces. The ball 12 is preferably positioned at a distance 15 of about 40% of the length of the pad 1 from its trailing edge. With this arrangement, the ball 12 serves also to locate the pad, as well as to form a mounting which permits tilting or self adjustment in every direction.

The tilting action of the above-described pads 1 is substantially the same as that in known tilting-pad or Mitchell bearings. Bearings in accordance with the invention, however, will run effectively in water and without any specific lubricant.

For some purposes, the supporting element for the pads 1 may comprise a plurality of segmental members carrying the pads, instead of consisting simply of a complete ring 2.

Bearings in accordance with the invention have applications in marine engineering, for example. There, they may be employed in connection with variable-pitch propeller mechanisms such as are described in the specifications of our patent application No. 619,759, filed October 2, 1945, and co-pending application No. 64,628, filed December 10, 1948. In such cases, it may be necessary to provide a double thrust bearing such as is shown in Figs. 6 and 7. Thrust pads 1 engageable with beryllium-copper surfaces on both sides of a flange 3¹ are supported on the insides of the flanges 2¹ of channel-shaped segments 16. The flange 3¹ is carried by a sleeve 17 which has screw-thread engagement with a fixed tube 18 embracing the propeller shaft 19 and is adapted for being turned through bevel gearing 20. The sleeve 17 does not rotate with the shaft 19 but can be adjusted axially in relation thereto by a limited turning movement imparted through the gearing 20. The segments 16, which do rotate with the shaft, are guided for axial movement in an extension 21 of the propeller boss and axial movements imparted to them through the thrust bearing are utilised in a manner with which this invention is not concerned for adjusting the pitch of the respective blades of the propeller. The bearing arrangement shown is capable of transmitting a thrust to either the right or the left in Fig. 6. The pitch-varying mechanism forms the subject of the aforesaid application and is more fully described therein.

For some uses of the invention, carbon or rubber may be used for the pads in place of the plastic material.

I claim:

1. A thrust bearing capable of operating without oleaginous lubricants comprising tilting pads of a non-metallic bearing material, a pad-supporting body, a metal bearing surface, co-acting with the said pads, which has a Brinell hardness of not less than 250 and small fulcrum plates each secured to the rear of a pad at its trailing end and disposed in contact with the pad-supporting body, the said body having an annular rib of part-circular section and the back of each fulcrum plate being of complementary concave shape.

2. A thrust bearing capable of operating without oleaginous lubricants, comprising tilting pads made of a synthetic plastic, a pad-supporting body, a metal bearing surface, co-acting with the said pads, which has a Brinell hardness of not less than 250, and metal fulcrum bodies each engaged with a tilting pad and each having a fulcrum formation engaged with the pad-supporting body.

3. A bearing according to claim 2, wherein each pad has a small metal plate secured to the rear of the pad at its trailing end, the fulcrum being formed by the leading edge of said plate.

ERNEST CHARLES HATCHER.

REFERENCES CITED

The following references are of record in the file of this patent:

UNITED STATES PATENTS

| Number | Name | Date |
|---|---|---|
| 1,158,424 | Banner | Nov. 2, 1915 |
| 1,975,115 | Masing | Oct. 2, 1934 |
| 2,427,730 | Latham | Sept. 23, 1947 |

FOREIGN PATENTS

| Number | Country | Date |
|---|---|---|
| 97,556 | Austria | July 25, 1924 |
| 554,550 | Great Britain | July 8, 1943 |
| 657,387 | France | May 22, 1929 |